United States Patent Office 3,021,352
Patented Feb. 13, 1962

---

3,021,352
PREPARATION OF S-(1-ALKENYL) PHOSPHORODITHIOATES
Bernard Miller, Stamford, Conn., assignor to American Cyanamid Company, New York, N.Y., a corporation of Maine
No Drawing. Filed Sept. 2, 1960, Ser. No. 53,613
5 Claims. (Cl. 260—461)

The present invention relates to novel S-(1-alkenyl) phosphorodithioates represented by the general formula:

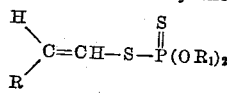

in which R is a hydrogen, a lower alkyl or an aryl radical and $R_1$ is lower alkyl, and to novel methods for the preparation thereof.

Phosphorothioate compounds of the present invention, which have the general grouping

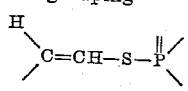

find utility as pesticides and, particularly, as insecticides. Advantageously, they are prepared by admixing an inert organic solvent, and in any desired order O,O,O',O'-tetraalkyl dithiophosphonothioate having the representative structure:

(1)
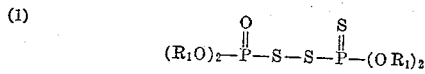

wherein $R_1$ is a lower alkyl radical, and approximately equimolar quantities of a metal vinyl compound conforming to either structure:

(2)
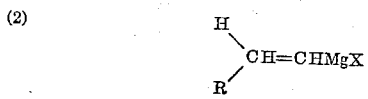

or (3)

wherein R is a lower alkyl or an aryl radical, M is an alkali metal such as sodium, potassium and lithium, and X is a halogen atom, such as chloro or bromo.

Reaction occurs rapidly and may be carried out at temperatures ranging from about 0° C. to about 50° C., and preferably from about 30° C. to 40° C.

Dithiophosphonothioates which can be employed herein are, for instance:

O,O,O',O'-tetramethyl dithiophosphonothioate,
O,O,O',O'-tetraethyl dithiophosphonothioate,
O,O,O',O'-tetra-n-propyl dithiophosphonothioate,
O,O,O',O'-tetrabutyl dithiophosphonothioate,
O,O,O',O'-tetrapentyl dithiophosphonothioate, homologs and isomers thereof.

Illustrative metal vinyl compounds contemplated herein are:

Vinyl magnesium bromide,
Vinyl magnesium chloride,
Styryle magnesium bromide,
Propenyl magnesium chloride,
Butenyl magnesium bromide,
Isobutyl magnesium chloride,
Vinyl lithium,
Vinyl sodium,
Vinyl potassium,
Propenyl lithium,
Butenyl lithium,
$\Delta^1$ pentenyl lithium.

Suitable inert solvents for the aforementioned reaction include:

Hexane,
Cyclohexane,
Dioxane,
Ether,
Xylene,
Toluene, and equivalents thereof.

The compounds of the present invention are highly active insecticides and may be used as sprays in organic solvents, as emulsions in water or other non-solvents, or on solid carriers, such as talc, clays, diatomaceous earths and the like. Such amounts of inert carrier may be used as are customarily employed in the art. However, the active pesticidal compound is present in amounts ranging from about 0.1 percent to about 5 percent based on the weight of the inert carrier.

In order to facilitate a further understanding of the invention, the following examples are given primarily for purposes of illustrating more specific details thereof. It is to be understood, however, that the scope of the invention is not to be deemed limited thereby, except as defined in the claims. Unless otherwise noted, parts given are by weight.

EXAMPLE 1

*Preparation of O,O-diethyl, S-(β-styryl) phosphorodithioate*

To a solution of 10 parts of O,O,O',O'-tetraethyl dithiophosphonothioate (0.027 mol) in 10 parts by volume of ether are added 50 parts by volume of 0.69 molar styryl magnesium bromide (0.035 mol). After stirring for twenty minutes, the reaction mixture is diluted with ether, poured into water, washed with dilute hydrochloric acid and dried over magnesium sulfate. The solvent is evaporated and the product distilled in vacuo to obtain a yield of 4.6 parts or 59 percent based on the theoretical amount of desired product which is a yellow liquid having an index refractive ($N_D^{25}$) equal to 1.582 to 1.583 and analyzing in percent as follows:

Calculated for $PS_2O_2C_{12}H_{17}$: C, 49.90; H, 5.94; S, 22.20; P, 10.73. Found: C, 50.35; H, 6.20; S, 22.45; P, 10.98.

EXAMPLE 2

*Preparation of O,O-dimethyl S-(β-styryl) phosphorodithioate*

Repeating Example 1 in every material detail except O,O,O',O'-tetramethyldithiophosphonothioate is substituted for the O,O,O',O'-tetraethyl dithiophosphonothioate reactant. O,O-dimethyl S-(β-styryl) phosphorodithioate is recovered in good yield and having a refractive index ($N_D^{25}$) equal to 1.6190, analyzing in percent as follows:
Calculated for $PS_2O_2C_{10}H_{13}$: C, 46.4; H, 5.03; S, 24.6; P, 11.89. Found: C, 40.6; H, 5.10; S, 25.5; P, 12.27.

EXAMPLE 3

*Preparation of O,O-dimethyl, S-vinyl phosphorodithioate*

To a solution of O,O,O',O'-tetramethyl dithiophosphonothioate (9.5 parts) in 25 parts by volume of ether are added in a suitable reaction vessel 25 parts by volume of 1.5 N vinyl magnesium bromide within 60 seconds. The reaction mixture is then diluted with ether, poured into water, washed with dilute hydrochloric acid and dried over magnesium sulfate. The solvent is evaporated and the product is distilled in vacuo to obtain 3.2 parts or 57.8 percent based on theoretical amount of desired light yellow liquid product having a refractive index ($N_D^{25}$) equal to 1.5331 and showing the following analysis for $PS_2O_2C_4H_9$ in percent:
Calculated: C, 26.05; H, 4.92; S, 34.7. Found: C, 26.38; H, 5.20; S, 35.03.

EXAMPLE 4

The phosphonothioate reactant in the above Example 3 is substituted by O,O,O',O'-tetraethyl dithiophosphonothioate and the procedure followed in every material detail. A good yield of O,O-diethyl, S-vinyl phosphorodithioate (62 percent of theory) is obtained. The desired compound has a refractive index ($N_D^{25}$) equal to 1.512 to 1.514 analyzing in percent as follows:
Calculated for $PS_2O_2C_6H_{13}$: C, 33.95; H, 6.17; P, 14.59; S, 30.19. Found: C, 33.85; H, 5.51; P, 14.85; S, 29.74.

EXAMPLE 5

*Preparation of O,O-diethyl, S-1-butenyl phosphorodithioate*

To 10.45 parts of O,O,O',O'-tetraethyl-dithiophosphonothioate (0.028 mol) having the structure:

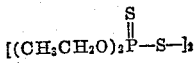

in 14 parts by volume of ethyl ether are added slowly 10 parts by volume (0.030 mol) of 3.03 N butenyl lithium in 20 parts by volume of ether. The addition requires about 15 minutes. The mixture is stirred for an additional 10 minutes, washed with water, and dried over magnesium sulfate. Evaporation of the solvent leaves 5.85 parts (86 percent of theory) of light brown liquid having a refractive index ($N_D^{25}$) equal to 1.520.

Other typical phosphorodithioates of the present invention which can be prepared according to the procedure of the above examples are:

O,O-diethyl-S-naphthylvinyl phosphorothioate,
O,O-diethyl-S-isopropenyl phosphorothioate,
O,O-dimethyl-S-n-propenyl phosphorothioate,
O,O-diethyl-S-1-butenyl phosphorothioate.

As above stated, the compounds of the present invention are highly active and effective insecticides. To demonstrate the marked degree of insecticidal activity, each of the products of the above examples are dissolved in a solvent therefor comprising 65 percent acetone and 35 percent water at a concentration of 0.1 percent based on the weight of the compound. The solution is sprayed on Nasturtium aphids and the results of the tests are presented in the table below.

TABLE I

| Compound | Percent Kill |
|---|---|
| O,O-Diethyl, S-(β-styryl) Phosphorodithioate | 98 |
| O,O-Diethyl, S-vinyl Phosphorodithioate | 100 |
| O,O-Dimethyl, S-(β-styryl) Phosphorodithioate | 100 |
| O,O-Dimethyl, S-vinyl Phosphorodithioate | 100 |

I claim:
1. A method for preparing phosphorodithioates represented by the general formula:

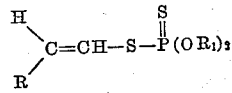

wherein R is a radical selected from the group consisting of lower alkyl, monocyclic aryl and dicyclic aryl and $R_1$ is a lower alkyl radical, which comprises: reacting in substantially equimolar amounts a metal vinyl compound selected from the group consisting of:

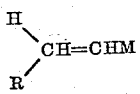

and

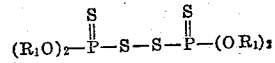

where R is as defined above, X is a halogen atom and M is an alkali metal, with a dithiophosphonothioate of the structure:

where $R_1$ is a lower alkyl radical.

2. A process according to claim 1, in which the metal vinyl compound is styryl magnesium bromide.
3. A process according to claim 1, in which the metal vinyl compound is styryl magnesium chloride.
4. A process according to claim 1, in which the metal vinyl compound is butenyl lithium.
5. A process according to claim 1, in which the dithiophosphonothioate is O,O,O',O'-tetraethyl dithiophosphonothioate.

References Cited in the file of this patent

UNITED STATES PATENTS

| | | |
|---|---|---|
| 2,266,514 | Romieux | Dec. 16, 1941 |
| 2,767,206 | Whetstone | Oct. 16, 1956 |
| 2,864,740 | Diveley | Dec. 16, 1958 |
| 2,864,741 | Diveley | Dec. 16, 1958 |

FOREIGN PATENTS

| 784,985 | Great Britain | Oct. 23, 1957 |

UNITED STATES PATENT OFFICE
CERTIFICATE OF CORRECTION

Patent No. 3,021,352            February 13, 1962

Bernard Miller

It is hereby certified that error appears in the above numbered patent requiring correction and that the said Letters Patent should read as corrected below.

Column 1, lines 30 to 32, the formula should appear as shown below instead of as in the patent:

$$(R_1O)_2\text{-}\underset{\underset{\parallel}{S}}{P}\text{-}S\text{-}S\text{-}\underset{\underset{\parallel}{S}}{P}\text{-}(OR_1)_2$$

Signed and sealed this 26th day of June 1962.

(SEAL)
Attest:

ERNEST W. SWIDER
Attesting Officer

DAVID L. LADD
Commissioner of Patents